United States Patent [19]
Hens et al.

[11] Patent Number: 5,641,920
[45] Date of Patent: Jun. 24, 1997

[54] POWDER AND BINDER SYSTEMS FOR USE IN POWDER MOLDING

[75] Inventors: Karl Frank Hens; Joseph A. Grohowski, Jr., both of State College, Pa.

[73] Assignee: Thermat Precision Technology, Inc., Corry, Pa.

[21] Appl. No.: 525,378

[22] Filed: Sep. 7, 1995

[51] Int. Cl.$^6$ .................................................. B22F 1/02
[52] U.S. Cl. ...................... 75/228; 75/255; 419/36
[58] Field of Search .................. 75/255, 228; 419/36

[56] References Cited

U.S. PATENT DOCUMENTS

| | | | |
|---|---|---|---|
| 2,694,245 | 11/1954 | Rogers et al. | 25/156 |
| 2,775,566 | 12/1956 | Crowley | 260/19 |
| 2,939,199 | 6/1960 | Strivens | 25/156 |
| 3,266,893 | 8/1966 | Duddy | 75/222 |
| 3,775,352 | 11/1973 | Leonard, Jr. | 260/2.5 B |
| 3,782,989 | 1/1974 | Mansur | 106/285 |
| 4,197,118 | 4/1980 | Wiech, Jr. | 75/228 |
| 4,225,345 | 9/1980 | Adee et al. | 75/211 |
| 4,280,973 | 7/1981 | Moskowitz et al. | 264/63 |
| 4,283,360 | 8/1981 | Henmi et al. | 264/63 |
| 4,386,960 | 6/1983 | Iacovangelo et al. | 419/9 |
| 4,415,528 | 11/1983 | Wiech, Jr. | 419/46 |
| 4,661,315 | 4/1987 | Wiech, Jr. | 419/10 |
| 4,765,950 | 8/1988 | Johnson | 419/2 |
| 4,780,437 | 10/1988 | Smith | 502/101 |
| 4,783,297 | 11/1988 | Ito et al. | 264/63 |
| 4,816,072 | 3/1989 | Harley et al. | 106/287.18 |
| 4,913,739 | 4/1990 | Thümmler et al. | 75/243 |
| 5,059,388 | 10/1991 | Kihara et al. | 419/37 |
| 5,155,158 | 10/1992 | Kim | 524/424 |
| 5,215,946 | 6/1993 | Minh | 501/97 |
| 5,244,623 | 9/1993 | King | 264/510 |
| 5,250,244 | 10/1993 | Kimura et al. | 264/63 |
| 5,279,787 | 1/1994 | Oltrogge | 419/38 |
| 5,310,520 | 5/1994 | Jha et al. | 419/48 |
| 5,312,582 | 5/1994 | Donado | 419/19 |
| 5,332,537 | 7/1994 | Hens et al. | 264/22 |
| 5,338,017 | 8/1994 | Workinger et al. | 428/551 |
| 5,350,558 | 9/1994 | Kawato et al. | 419/35 |
| 5,368,795 | 11/1994 | Quadir | 264/63 |
| 5,380,179 | 1/1995 | Nishimura et al. | 419/36 |
| 5,397,531 | 3/1995 | Peiris et al. | 419/36 |
| 5,403,542 | 4/1995 | Weinl et al. | 419/13 |
| 5,409,650 | 4/1995 | Holme | 264/63 |
| 5,415,830 | 5/1995 | Zhang et al. | 419/36 |
| 5,423,899 | 6/1995 | Krall et al. | 75/231 |
| 5,429,792 | 7/1995 | Luk | 419/36 |
| 5,437,825 | 8/1995 | Jensen | 264/56 |

*Primary Examiner*—Charles T. Jordan
*Assistant Examiner*—Daniel Jenkins
*Attorney, Agent, or Firm*—Oliver A. Zitzmann

[57] ABSTRACT

Provided is a powder and binder system for manufacturing sintered parts from particulate material, and a method of injection molding parts for sintering. The particulate material includes ceramic, metallic and intermetallic powders. Preferably, selected powder particles are coated with one or more additives depending on their shape and surface chemistry to create a powder system. The additives may include antioxidants, coupling agents, surfactants, elasticizing agents, dispersants, plasticizer/compatibilizers and lubricants. The surface active additives are designed to improve the interface between the powder and the binder. The powder system may be mixed or compounded with a binder system in an inert atmosphere to form a powder and binder system, or feedstock, for powder molding. The binder system, may contain one or more components which are removed prior to the sintering the powder. The powder and binder system may also be molded about an expendable core which is extracted prior to sintering.

47 Claims, 2 Drawing Sheets

POWDER AND BINDER SYSTEMS FOR USE IN POWDER MOLDING

TECHNICAL FIELD

The present invention relates to powder and binder systems for manufacturing sintered components from particulate material, and a method of powder injecting molding parts for sintering.

BACKGROUND OF THE INVENTION

Powder injection molding is a well known technique for manufacturing articles from particulate material and examples of such systems are represented in: U.S. Pat. No. 5,415,830, Zhang et al., U.S. Pat. No. 5,397,531, Peiris et al., U.S. Pat. No. 5,332,537, Hens et at., U.S. Pat. No. 5,155,158, Kim et al., U.S. Pat. No. 5,059,388, Kihara et at., U.S. Pat. No. 4,765,950, Johnson, U.S. Pat. No. 4,661,315, Wiech, U.S. Pat. No. 4,415,528, Wiech, U.S. Pat. No. 4,225,345, Adee et at., and U.S. Pat. No. 4,197,118, Wiech. In these prior art systems, powders and binders are mixed to form the feedstock which is powder injection molded. The feedstock production is the most important step in the powder injection molding technology. If components are manufactured from inferior feedstock, it will be difficult, if not impossible to produce consistent components of high tolerances without secondary processes such as coining or machining.

Feedstock homogeneity and compositional accuracy are a major challenge for manufacturers using powder injection molding. Problems with components such as cracking and nonuniform shrinkage during debinding and sintering can often be traced back to feedstock production.

Conventional practice in powder injection molding is that powders having the elemental composition of the desired final product are mixed with an additive and a binder mixture to form the feedstock. The binder mixture may contain two primary components in a heterogeneous mixture. The first component of the binder, also referred to as the major component, is typically a polymer component such as a wax or a water soluble component. This is used, in part, to provide a medium to transport the powder into the mold. The major component is typically designed for good moldability and easy removal during the debinding phase. The second component of the binder, also referred to as the backbone component, is used to retain the shape of the compact while the first component is removed. The backbone component is, generally, removed just before the powder particles start to sinter.

These known feedstocks have solids loadings around 50 to 60 percent by volume. Such systems have inherent problems in that a relatively large proportion of the feedstock is binder which is used to make the feedstock flow, causing significant shrinkage of the molded components during the debinding and sintering phases. Moreover, during the thermal removal of the binder, the components are heated through the molding temperature of the feedstock, causing shape loss. Shape loss also occurs in these prior art systems because the binder components with a lower molecular weight decompose or volatilize during the mixing of the feedstock and during injection molding. As a result of this shrinkage and deformation, parts manufactured by these known methods may require expensive supporting equipment to retain the shape of the molded component prior to sintering. Additionally, the parts may require machining after sintering if tolerances are not met. The parts are also limited to relatively small component sizes.

SUMMARY OF THE INVENTION

The present invention provides a new and improved powder and binder system and a new and improved method for powder injection molding. The powder and binder system of the present invention may be used as feedstock in any prior art injection molding process in which ceramic, metallic or intermetallic particles are injection molded.

The present invention provides an injection moldable powder and binder system comprising powder particles coated with at least one additive, and a binder combined with the powder particles. In accordance with another feature of this invention, an injection moldable powder system is provided which comprises a mixture of a prealloyed powder and an elemental/semi-elemental powder. In accordance with another feature of this invention, an injection moldable powder system is provided which comprises a mixture of a prealloyed powder and an elemental/masteralloy powder. In accordance with another feature of this invention, an injection moldable powder system is provided which comprises a mixture of a prealloyed powder, an elemental/semi-elemental powder and an elemental/masteralloy powder.

According to yet another feature of this invention, a injection moldable powder and binder system is provided in which the powder and binder are combined in an inert atmosphere. According to yet another feature of this invention, a injection moldable powder and binder system is provided comprising a powder for injection molding and a binder system in which the binder components are combined in an inert atmosphere.

According to a further feature of this invention, an injection moldable powder and binder system is provided comprising a powder for injection molding and a binder system containing a binder component and a plasticizer/compatibilizer component, wherein the binder system is combined with the powder.

The present invention further provides a method of powder injection molding parts for sintering comprising the steps of shaping a core, molding a powder and binder mixture about the core, and removing the core from the powder, binder mixture, and removing the binder for sintering of the powder.

These and other features, as well as the scope, nature and utilization of the present invention will be apparent to those skilled in the art from the following description and the appended claims.

DESCRIPTION OF THE PREFERRED EMBODIMENTS

Figure 1:
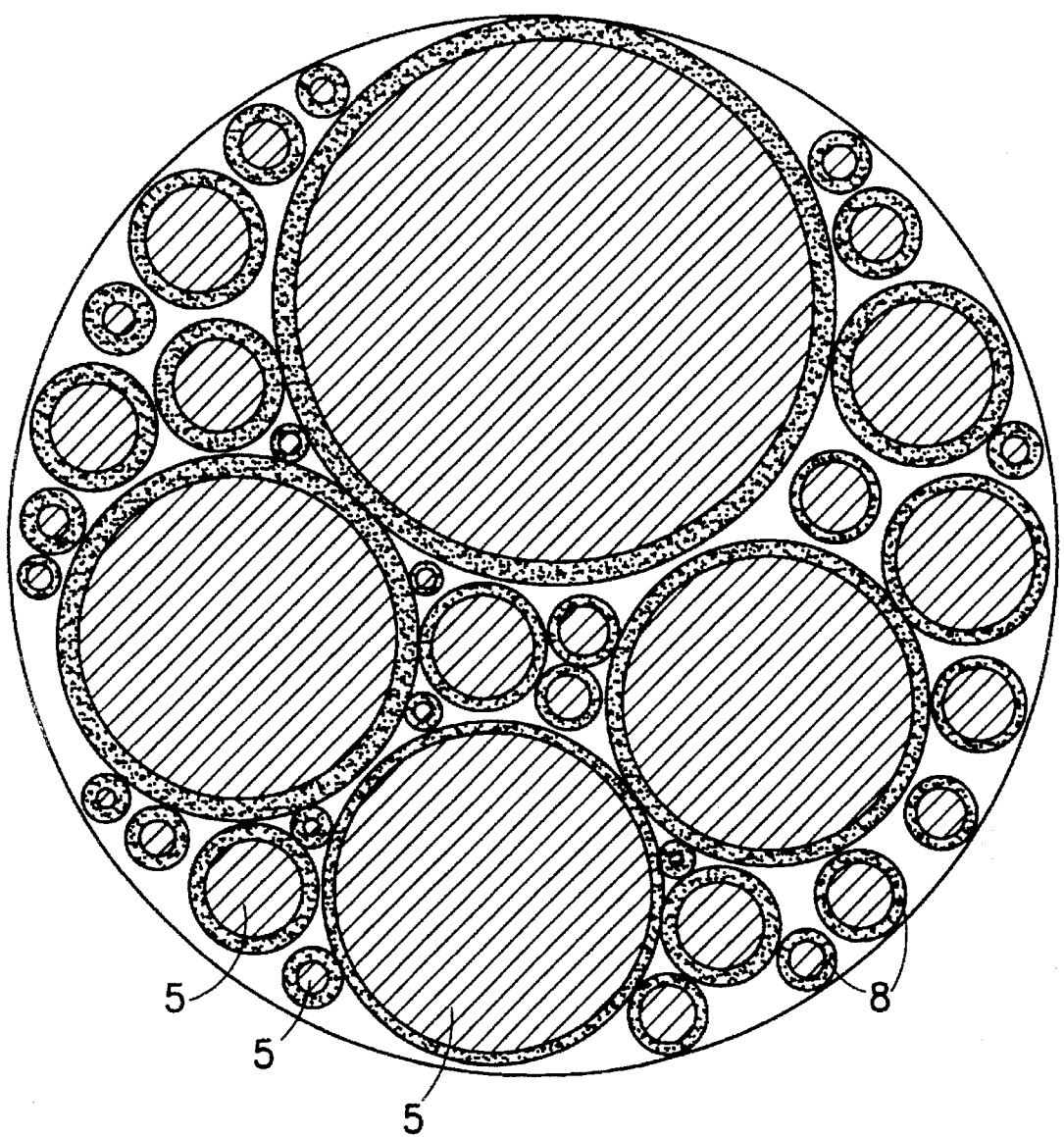
FIG. 1 is a greatly enlarged and schematized example of a spherical particle size distribution which maximizes solids loading of the powder and binder system.

The powder and binder system of the present invention is applicable to any powder injection molding technique in which a powder or binder mixture, also referred to as feedstock, is used for powder injection molding. The particular powder particles may be ceramic, metallic and/or intermetallic, depending upon the desired characteristics of the final product. The powder and binder system of the present invention allows injection molding of powders with increased solids loading resulting in less shrinkage and deformation during debinding and sintering.

The powder and binder system provides increased interparticle friction and a higher number of particle to particle contact points after debinding. During the critical phase when all the binder is thermally removed but sintering has not begun, shape retention is accomplished largely by inter particle friction and particle to particle contacts. By having a greater amount of powder in the molded component, the shape retention in this phase is significantly improved. As a result, the component is more robust and easier to handle during the debinding and sintering stages. This reduces the production cost of the injection molded components since expensive supporting equipment is not needed and the components are not as sensitive to handling, i.e., vibration sensitive. Additionally, components manufactured with this new and improved powder and binder system and method can be produced to tighter tolerances than previously possible.

According to one embodiment of the present invention, the powder and binder system, may be optimized for powder injection processing by powder classification, coating, blending, mixing and/or modification to achieve particle size and shape distributions and surface chemistries which are optimal for injection molding. The powders required for the composition of the final product are selected according to their size and shape distribution and surface chemistry. Powders of a selected particle size, shape or surface chemistry which may not be compatible with a binder are coated with one or more additives. Different powders are then blended to ensure a size distribution yielding maximum solids loading and mixed or compounded with a binder system of one or more constituents. This allows the additive and binder to perform their functions most effectively and ensures that maximum solids loading is obtained.

If metallic powders are to be injection molded, the powders are typically selected from four types: prealloyed powders, elemental powders, semi-elemental powders and master-alloy powders. A prealloyed powder has the composition desired for the final product, that is, each of the powder corns or particles contains all the elements of the final product. To produce this powder, a steel having the desired composition can be molten and subsequently pulverized. For metal injection molding, gas and water atomized prealloyed powders can be used.

An elemental powder is typically composed of one element only. For example, if a steel consisting of 92% iron and 8% nickel is to be made by powder injection molding using elemental powders, 92% of carbonyl steel elemental powder can be blended with 8% nickel elemental powder to achieve the desired alloy.

Semi-elemental powders are added to an elemental powder to achieve the desired composition of elements. For example, instead of adding 15% elemental chrome powder to a iron based powder to form 17-4PH stainless steel, 30% of a semi-elemental ferro-chrome powder consisting of 50% iron and 50% chrome is mixed with the iron based powder. A mixture of the elemental and semi-elemental powders which make up the correct composition of the desired final product is referred to as an elemental/semi-elemental powder.

Similarly, a master-alloy powder consists of the correct ratios of all the elements for the desired final product, except the base powder which is present only in small portions. For example, if the desired final alloy consists of 78% iron, 15% chrome, 4% nickel, and 3% copper, a master-alloy can be prepared which contains only 20% iron, while chrome, nickel, and copper are in a 15:4:3 ratio. To create the desired final powder, the master-alloy must be mixed with elemental iron powder. The mixture of the elemental and master-alloy iron powder is referred to as an elemental/master-alloy powder.

It has been found that a combination of 40 to 70 percent prealloyed powder with 30 to 60 percent elemental/semi-elemental powder and/or 30 to 60 percent elemental/master-alloy powder results in improved moldability and improved sintering behavior. Combining the different types of metallic powders reduces the sintering temperature needed for a given material to accomplish a diffusion of the different phases. Higher sintering temperatures can give rise to problems such as the evaporation of lower temperature elements in the alloy, i.e., copper in stainless steel.

Powder systems for powder injection molding (PIM) feedstock according to the present invention are selected by combining or blending powders to optimize size and shape distribution as well as surface chemistries of the particles. This selection can influence and control the viscous and plastic flow, evaporation-condensation, lattice, grain boundary surface diffusion and sintering mechanisms. According to an embodiment of the present invention, the size and shape distribution and surface chemistry of the powder or powders used significantly affects the properties of the final PIM product.

The size distribution of the particles in a powder can influence, for instance, solids loading, moldability and diffusion during sintering. The shape of the particles is important for flow behavior and shape retention during thermal processing. Surface chemistry can influence the manner in which a powder and binder system is prepared and which additives must be applied to the powder.

The powder size of a powder lot is classified using the D90 and D10 sizing. The D90 measurement indicates that 90% of the powder lot in question is smaller than this size. The D10 measurement indicates that 10% of the powder lot in question is smaller than this size. The different powders are selected and/or blended to maximize the D90/D10 ratio, while keeping the fraction of particles above the average particle size between 50 and 80% by volume.

Powders of different particle size distributions are blended to optimize the powder packing characteristics and to optimize the amount of solids loading in the powder system. FIG. 1 shows a greatly enlarged and schematized example of a particle size distribution which maximizes solids loading of the powder and binder system by multi-modal particle size distribution. The correct amount of small particles must be available to fill up spaces between larger powder particles. As an example, combining 40 to 70% of a larger particle powder, for instance, a classified portion or an atomized powder, with 30 to 60% of a smaller particle powder, for instance, a classified portion or an elemental/semi-elemental powder, yields a much higher critical solids loading level in PIM than the powders individually. Using these size distributions, stainless steels have been injection molded with solids loadings above 72% by volume, resulting in reduced shrinkage and better shape retention during debinding and sintering.

It has been found that smaller particle sizes should be selected for powders used in smaller percentages in the desired product. This results in higher attainable solids loading, better moldability, and better diffusion during sintering. For example, assuming a desired alloy contains 80% of element A, 15% of element B, 3% of element C, and 2% of element D. The necessary sintering temperature will be lower, and the physical properties of the injection molded component will be superior, if element A is 15 microns, B is 8 microns and C and D are 2.5 microns. The larger particle sizes for the base element leads to a more homogeneous mixture and better diffusion during sintering.

Figure 2:
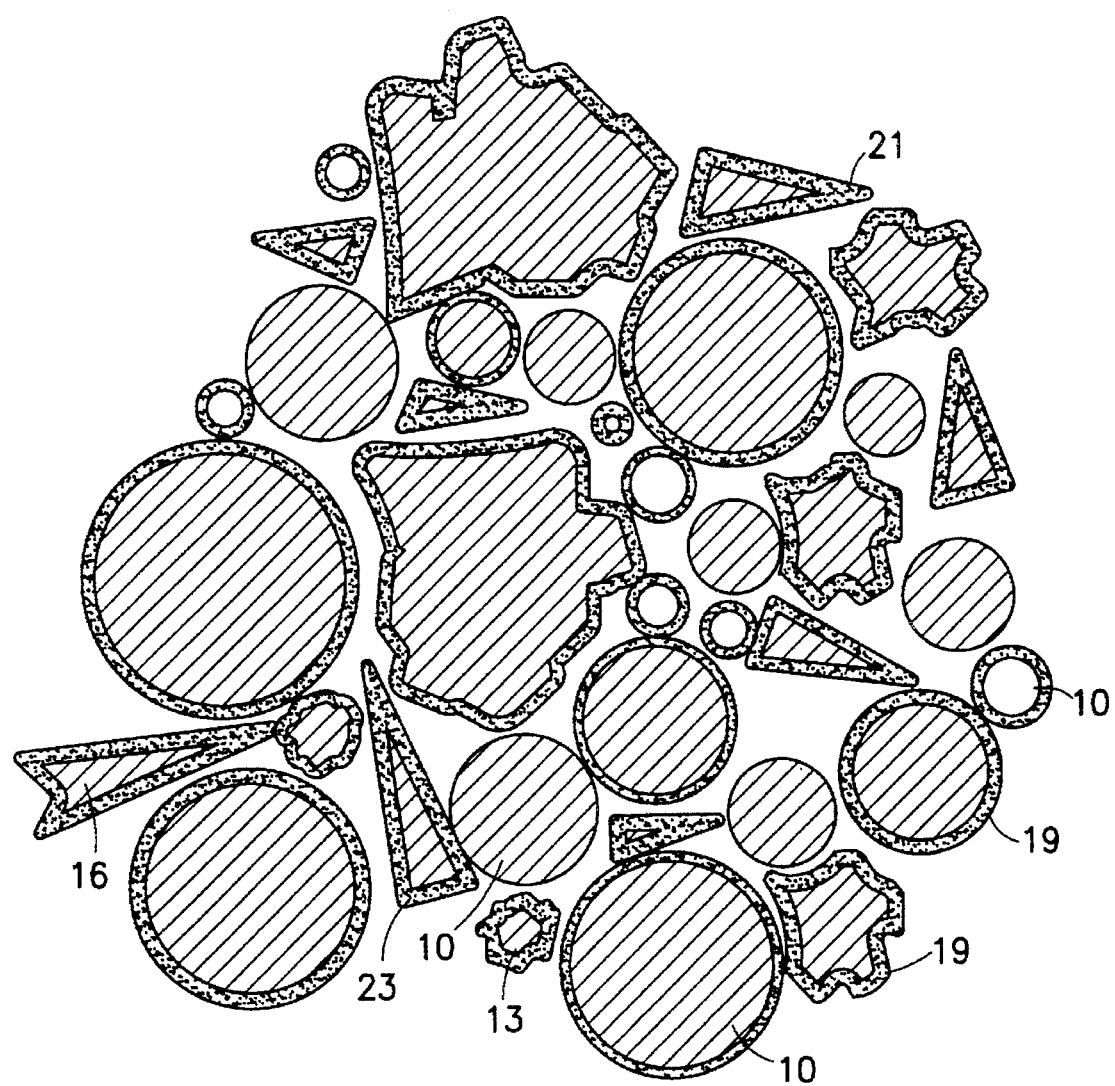
FIG. 2 is a greatly enlarged schematic illustration of the shapes of the powder particles.

FIG. 2 shows a greatly enlarged schematic illustration of the shapes of the powder particles. The shapes of the particles can be defined by three general categories: spherical, irregular and angular. Spherical powders 10 may be produced by gas atomization, by the carbonyl iron process, or by other processes yielding a shape of each powder particle which is nearly or perfectly spherical. Irregular powders 13 are produced by water atomization or other processes yielding a powder particle shape which can be irregular or somewhat ligamental. Angular powders 16 are produced by crushing or grinding processes from ore, or other processes resulting in powders which are angular in shape.

According to the embodiment of the present invention, powders of different shapes are mixed to optimize packing and flow behavior, and to maximize shape retention of the component during thermal processing. While spherical powders generally flow better than irregular powders, the shape retention characteristics of irregular powders is superior. Similarly, irregular powders generally flow better than angular powders, the shape retention characteristics are superior for angular powders. Powder mixtures from 55 to 95% spherical combined with 5 to 45% of either irregular or angular powders, or a combination thereof, can result in improved flow behavior and better shape retention in the final stages of debinding and initial stages of sintering.

According to this invention, powders with different surface chemistries are cross-blended or otherwise combined to take advantage of different characteristics that each of the different powder types exhibit. The surface chemistry of the powders is dictated by the method of preparation of the powder. As an example, to produce a stainless steel or tool steel, the use of 40 to 60% gas atomized powder with 5 to 30% water atomizer powder, and 10 to 35% of carbonyl powder, and 5 to 30% of mechanically prepared semi-elemental powder has shown to produce a powder system with very high solids loading content, superior moldability, better debinding characteristics, and better sintering behavior.

According to this invention, a powder may be coated with an additive prior to combining the powder with other powders having different surface chemistries. FIG. 2 shows an example of a powder system certaining powder particles coated with an additive. These additives 19, 21 and 23 can include coupling agents, antioxidants, surfactants, lubricants, dispersants, elasticizing agents, plasticizers/compatibilizers and others. The additives are used, in part, to ensure that the binder effectively coats or attaches to the powder particles. Some surface chemistries may react or be incompatible with the binder and, therefore, need to be coated with an additive prior to introduction of the binder. Different surface chemistries may be pretreated with different additives to allow the appropriate additives to perform its function most effectively.

These additives are applied by known methods including solvent slurry techniques, wet/dry milling, fluidization techniques, spray drying, dry dispersion or other techniques. The additives designed to interact directly with the powder surface, such as the antioxidants, surfactants, dispersants or coupling agents, are used for the initial coating of the powder. Application sequence of surface-active agents is dependant upon powder chemistry and varies according to known chemical properties.

Powder and binder systems according to the present invention are structured to allow for rapid processing or separation of reactive or incompatible components. For example, a metallic powder which may react or be incompatible with the backbone component of the binder, is pretreated with an organometallic coupling agent or a surfactant, typically at levels of 0.3 to 15 binder weight percent. This pretreated powder can then be coated with the backbone phase at levels of 4 to 45 binder weight percent and mixed or compounded with the remaining binder constituents. As a result of this structuring, coherent binder phases exist that allow for lower backbone phase levels and faster processing. Coherent phases also allow the isolation of incompatible or reactive elements. In this manner materials which could not be mixed in a random manner are consolidated into usable feedstock.

Antioxidants, such as thermal stabilizers or metal deactivators may also be used individually or in combination with one another to stabilize polymers containing reactive metals. More reactive materials may cause a catalytic decomposition of the polymers. Large surface areas of the powders exaggerate this problem. Typical levels of these additives range between 0.1 and 2.5% by weight of the binder. For example, 1% Tetrakis [methylene (3,5-di-tert-butyl-4-hydroxyhydrocinnamate)] methane is used in conjunction with 1% 1,2-bis-(3,5-di-tert-butyl-4-hydroxyhydrocinnamoyl) hydrazine to stabilize an acetal based water soluble binder system used with carbonyl iron.

Organometallic coupling agents are used to improve the interface between the polymer and the powder surface. The rheological properties and loading abilities of binder systems are greatly improved by coupling the organic and inorganic phases of a powder binder system. The metal functionality is chosen based upon the powder being used and acceptable decomposition products. The organic part of the coupling agent is chosen based on the polymer used for the backbone.

For tungsten carbide-cobalt, a titanium based organometallic coupling agent (titanate) may be used with WC-Co powder. The titanium functionality of the coupling agent has an affinity for the powder surface and the chemistry of the alloy tolerates the inorganic decomposition products (titanium ceramics). Typical levels range between 0.5 and 15% by weight of the binder. For example, 10% by weight of the binder titanium IV 2,2 (bis 2-propenolatomethyl) butanolato, tris(dioctyl) phosphate-0 is used with an acetal based water soluble binder system. Other timnates such as aliphatic amino titanate and aliphatic carboxyl titanate may also be used.

For alumina, an aluminum based coupling agent (aluminate) may be used with alumina powder. The aluminum functionality of the coupling agent has an affinity for the alumina surface. Typical levels range between 0.5 and 15% by weight of the binder. Thermal decomposition of the coupling agent in air yields alumina, leaving no contamination due to the coupling agent. As an example, 10 binder weight percent diisopropyl(oleyl) aceto acetyl aluminate can be used as a coupling agent in an acetal based water-soluble binder system. Other aluminates may also be used.

For carbonyl iron, a silicon based coupling agent (silane) may be used with silica coated carbonyl iron. The silicon functionality exhibits an affinity for the silica surface of the carbonyl iron and the decomposition product of silica is tolerable in most ferrous alloys. Typical levels range between 0.3 and 8% by weight of the binder. For example, 1.2% by weight of the binder N-(-aminoethyl)- aminopropyltrimethoxysilane is used in an acetal based water soluble system.

A titanate is another example of a coupling agent which can also be used with uncoated carbonyl iron. Decomposition products of the titanate are acceptable titanium ceramics. Typical levels range between 0.5 and 8% by weight of the binder. For example, 4% by weight of the binder titanium IV 2,2 (bis 2-propenolatomethyl) butanolato, tris(dioctyl) phosphate-0 may be used in a cellulose acetate butyrate based water soluble binder system. Other titanates such aliphatic amino titanate and aliphatic carboxyl titanate may be used as well.

The additives can be coated onto the powder in a sequential or simultaneous manner. Powders may be treated with the necessary additive(s) prior to combining the powder with other powders requiring a different additive. The powders should be coated to prepare a layered or onion type particle/additive interface. FIG. 1 shows spherical particles 5 coated with a single layer of an additive 8. In one preferred embodiment, a monolayer on the molecular level of these additives is applied in a sequential fashion.

The ceramic, metallic or intermetallic powder system is then prepared with one or more binder components to form a powder and binder system. This preparation may occur by coating the powder with one or more binder components, or by mixing or compounding the powder and the binder components. For example, a layer of the backbone binder may be applied to the powder particles by a known coating method, or the backbone may be first combined with the major binder component and then mixed or compounded with the powder.

A plasticizer/compatibilizer may be added with the backbone to lower the viscosity of the powder and binder system. A plasticizer/compatibilizer such as monoglycerol monostearate may also serve to ensure a more heterogenous mix of the binder components. The backbone and major component, together with other additives such as the plasticizer/compatibilizer and internal mold lubricants can be combined simultaneously or sequentially with the powder.

According to the present invention, major and backbone binder components of several different molecular weights are used to achieve good flowability, good green strength of the molded component, and a wide range of temperatures over which the binder system decomposes during debinding. Binder components with a higher molecular weight have a higher melting point and exhibit higher strength and greater memory effects. Binder components with low molecular weight are liquid at fairly low temperatures but are somewhat weak and have little memory effects. As a result, low molecular weight binder components flow well at lower temperatures and keep their molded shape. These binder components can be decomposed at low temperatures to remove them after molding. High molecular weight binder components give a molded part a lot of strength, but have a high viscosity and a bad memory effect, i.e. if pressure is exerted onto the binder during molding residual stresses will remain in the molded part which can warp the part during debinding. The higher molecular weight polymers also decompose at a much higher temperature. It is desirable to decompose some of the binder at a temperature close to the sintering point of the particles. This minimizes the weak phase during which all the binder has been removed and the molded parts are held together by inter-particle friction and particle to particle contact.

It is preferred to use several binder components of the same chemical composition, at different molecular weights. For example, a polypropylene can be used with a molecular weight as low as 40,000, together with other polypropylenes in the range of 80,000, 100,000, and 150,000 molecular weight. These are combined together into the binder system. The resultant moldability is very good due to the lower molecular weight component and the green strength is good due to the higher molecular weight component. Additionally, the polymer decomposes over a wider temperature range.

Any polymers used as the major component of the binder in the injection molding art, including waxes and water soluble components, can be used as a major component in the present invention. Polyethylene glycol is an example of a major binder component which is water soluble that can be used with many powders of a low reactivity such as stainless steels or alumina. A major component with a modified functionality, such as methoxypolyethylene glycol is used with materials exhibiting more reactive surfaces such as iron, copper or tungsten carbide-cobalt. The substitution of a methoxyl functional unit for a hydroxyl functionality allows the use of more reactive metals, higher solids loadings and lower ash content, i.e., the impurities left behind after thermal decomposition. A methoxypoylethylene glycol may also be used with materials such as stainless steel or alumina to provide higher purity compacts due to lower residual ash content. Typical levels of the major component are 40 to 90% by weight of the binder.

Any polymers used as the backbone component of the binder in the injection molding art, can be used as a backbone component in the present invention. For example, binder systems for less reactive powders, i.e., stainless steel or alumina, may use an acetal based polymer backbone component, such as poly oxymethylene. Typical levels of acetal polymer are 10 to 45% by weight of the binder. The acetal is heavily plasticized by certain polymers used as major binder components, such as polyethylene glycol and methoxypolyethylene glycol. Additional plasticizers/compatiblizers may also be used.

More reactive materials such as iron, can require a blend of acetal and acrylic polymer as the backbone component. Typical acrylic levels range from 2 to 35% by weight of the binder. If a water soluble major component is used, a plasticizer/compatibilizer may be added to compatibilize the acrylic and the water soluble component. Although the major component may heavily plasticize the acetal, it may be desirable to further plasticize the acetal by adding a plasticizer/compatibilizer at levels from 1 to 15% by weight of the binder. As an example, a blend of 30% by weight of the binder acetal and 10% by weight of the binder polymethylmethacrylate is used with iron powders to provide better molded surface finish and flexibility of molded parts. Additionally, 5% by weight of the binder of a compatibilizer/plasticizer such as monoglycerol monostearate is used to compatibilize and plasticize the binder phases, providing for lower melt viscosities and high solids loadings. The acrylic component can also help to give the injection molded component more elasticity and flexibility during ejection.

Major components such as polyethylene glycol or methoxypolyethlyene glycol have a very slight or no plasticizing effect on certain polymers, e.g., polyolefins and acrylics. Consequently, the water soluble phase is extracted more rapidly. If the backbone component is not heavily plasticized by the major component, the addition of a polymer serves to modify the crystalline behavior of the major component serves. Acetal may be used to effect this behavior with water soluble major components. Typical acetal levels range from 2 to 30% by weight of the binder. The acetal is plasticized by the water soluble component and serves to suppress crystalline behavior of the water soluble component. Other polymers may also be used to suppress this behavior. Because of this lack of interaction between the backbone and water-soluble phases the water-soluble component can be extracted more rapidly. A blend of 25% by weight of the binder of polypropylene and 7% by weight of the binder of acetal is used with stainless steel or iron to provide a more rapid debinding system. Appropriate plasiticizers/ compatiblizers may also be used. As an example, 5% by weight of the binder of paraffin and 5% by weight of the binder of monoglycerol monostearate are used.

Another backbone approach would be to use a polymers having a specific functionality according to powder surfaces. Polymers having an affinity for the powder surface allow the polymer to behave as both a surface active agent, i.e. surfactant, and a backbone component. Because this lends structure to the binder phases, lower amounts of backbone can be used if more rapid debinding is desired. This is also used to isolate incompatible or reactive materials. For example, a cellulose ester, cellulose acetate butyrate is used with carbonyl iron at 10% by weight of the binder and provides rapid debinding of the compacts with a coherent phase structure. Appropriate plasiticizers/compatiblizers may also be used.

The individual binder components, or the powder and binder systems can be combined by mixing or compounding them in an inert atmosphere to ensure that the lower molecular weight components do not decompose at this stage. When mixing or compounding the binder components, or the powder and binder system, some binder components may start decomposing at temperatures before other components reach a liquid state. Mixing or compounding in an inert atmosphere allows the use of very low and very high melting temperature binder components together. The mixing unit or the compounder, in addition to the collection unit should be purged with an inert gas.

Mixing of the individual binder components or the powder and binder systems, may be done using a prior art mixer.

The compounding of the powder and binder systems is performed using a paddle type or interlocking screw type twin screw compounder, with co- or counter-rotating screws or shafts. The compounding equipment may use very high shear rates to compound the feedstock in order to break up agglomerates of powder during the mixing process. This results in a much more homogeneous powder and binder system.

EXAMPLE ONE

An example composition of water soluble binder system for carbonyl iron powder is:

| | |
|---|---|
| 1.2% | N-( -aminoethyl)- -aminopropyltrimethoxysilane |
| 1.0% | Tetrakis [methylene(3,5-di-tert-butyl-4-hydroxyhydrocinnamate)] methane |
| 1.0% | 1,2-bis-(3,5-di-tert-butyl-4-hydroxyhydrocinnamoyl) hydrazine |
| 4.0% | Monoglycerol monostearate |
| 10.0% | Polymethylmethacryalate |
| 30.0% | Poly oxymethlyene |
| 52.8% | Methoxypolyethylene glycol |

EXAMPLE TWO

An example composition of water soluble binder system for tungsten carbide-cobalt powder is:

| | |
|---|---|
| 10.0% | Titanium IV 2,2 (bis 2-propenolatomethyl) butanolato, tris(dioctyl) phosphate-O |
| 1.0% | Tetrakis [methylene (3,5-di-tert-butyl-4-hydroxyhydrocinnamate)] methane |
| 1.0% | 1,2-bis-(3,5-di-tert-butyl-4-hydroxyhydrocinnamoyl) hydrazine |
| 5.0% | Monoglycerol monostearate |
| 30.0% | Poly oxymethlyene |
| 53.0% | Methoxypolyethylene glycol |

The powder and binder system of the present invention is injection molded according to techniques practiced in the art. These prior art techniques are used for injecting the powder and binder system into a mold to form a component; for debinding the component by removal of one or more binder components; and for sintering the powder system in the component. Nonlimiting examples of powder injection techniques in which the powder and binder system according to the present invention can be applied are given in: U.S. Pat. No. 5,415,830, Zhang et al., U.S. Pat. No. 5,397,531, Peiris et at., U.S. Pat. No. 5,332,537, Hens et at., U.S. Pat. No. 5,155,158, Kim et at., U.S. Pat. No. 5,059,388, Kihara et al., U.S. Patent No. 4,765,950, Johnson, U.S. Pat. No. 4,661,315, Wiech, U.S. Pat. No. 4,415,528, Wiech, U.S. Pat. No. 4,225,345, Adee et at., and U.S. Pat. No. 4,197,118, Wiech.

These known powder injection molding techniques allow for injection molding of feedstock at solids loadings between 50 and 60% by volume, resulting in shrinkages in the 14 to 20% range. According to the present invention, the powder and binder system can be injection molded with solids loading over 72% by volume, resulting in shrinkage in the 9 to 14% range.

In accordance with another feature of the present invention, expendable cores are used for powder injection molding. Expendable cores may be used where, for instance, a formation of complex internal cavities is required, which would be impossible or very expensive to form using conventional molding technology. Either a prior art PIM feedstock, or a powder and binder system as disclosed herein, is molded by an injection molding technique known in the art, around or about a shaped element or core. The core is then removed during post molding processing. This core may be removed by a known extraction technique, including chemical extraction, thermal extraction or by any other suitable method whereby the shape of the core is not retained during extraction. A cavity in the shape of the core remains where the core has been. Expendable cores are particularly beneficial for very complex cavities or internal cavities with limited access from the exterior of the part.

The expendable core may require a single phase or multiple phase extraction schedule depending on its composition. The number of phases required for extraction of the core depend on the number of constituents of the core. Generally, the number of phases for extraction is the same as the number of constituents. One or more constituents of the core may also be binder components.

Processing of the core may begin prior to incorporating the core into the compact. A core of two or more components may have one or more components extracted prior to injection molding the feedstock around the core of at least one remaining component. The remaining component or components may be crosslinked. This preliminary extraction has been found to decrease the time required for extraction of the expendable core after molding.

After extraction of the expendable core, any remaining binder components are rebound by techniques practiced in the art. The injection molded part is then sintered by known techniques.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An injection moldable powder and binder system comprising:
   (a) powder particles, each particle having a respective surface;
   (b) an additive selected from the group consisting of coupling agents, antioxidants, surfactants, elasticizing agents, and plasticizers/compatibilizers, coating a portion of said respective particle surface; and
   (c) a binder combined with said powder particles.

2. The powder and binder system according to claim 1 wherein said coupling agent is an organometallic coupling agent.

3. The powder and binder system according to claim 1 wherein said binder is comprised of a first and a second binder component.

4. The powder and binder system according to claim 3 wherein said first binder component can be transformed from a thermoplastic to a thermoset by cross-linking.

5. The powder and binder system according to claim 4 wherein said first component is selected from the group consisting of a polyvinyl-butyral, an acetal, an acetal copolymer and an ester.

6. The powder and binder system according to claim 4 wherein said first component is a cellulose acetate butyrate.

7. The powder and binder system according to claim 3 wherein said second binder component is water soluble.

8. The powder and binder system according to claim 7 wherein said second binder component is selected from the group consisting of polyethylene glycol, polyethylene oxide, polyvinyl alcohol, carboxymethylcellulose, polyacrylamide, polyvinyl ether, polyacrylic acid, poly(2-ethyl 2-oxazoline) and polymethacrylic acid.

9. The powder and binder system according to claim 3 wherein said second binder component is a synthetic wax component.

10. The powder and binder system according to claim 9 wherein said synthetic wax component is methoxypolyethylene glycol with a molecular weight below 6,000.

11. The powder and binder system according to claim 3 wherein said first and said second binder component are combined in a substantially inert atmosphere.

12. The powder and binder system according to claim 11 wherein said coupling agent is selected from the group consisting of silane, titanate, aluminate and zirconate.

13. The powder and binder system according to claim 1 wherein said antioxidant is selected from the group consisting of a hindered phenolic, a thioester synergist, a tocopherol, a tocotrienol and an ether of hydroquinone.

14. The powder and binder system according to claim 1 wherein said additive is a surface active agent.

15. The powder and binder system according to claim 14 wherein said surface active agent is selected from the group consisting of a stearic acid and a metal stearate.

16. The powder and binder system according to claim 1 wherein said additive is a thermal stabilizer.

17. The powder and binder system according to claim 16 wherein said thermal stabilizer is a hindered phenolic.

18. The powder and binder system according to claim 1 wherein said additive is a metal deactivator.

19. The powder and binder system according to claim 1 wherein said binder is comprised of at least one internal mold release lubricant.

20. The powder and binder system according to claim 19 wherein said internal mold release lubricant is selected from the group consisting of synthetic wax, natural wax, silicone and inorganic polymer.

21. The powder and binder system according to claim 1 wherein said powder particles are a metallic powder.

22. The powder and binder system according to claim 21 wherein said metallic powder comprises at least 70 percent by volume of said powder and binder system.

23. The powder and binder system according to claim 21 wherein said metallic powder is selected from the group consisting of a stainless steel, a tool steel, a carbon steel and a superalloy.

24. The powder and binder system according to claim 1 wherein said powder particles are a ceramic powder.

25. The powder and binder system according to claim 24 wherein said ceramic powder comprises at least 70 percent by volume of the powder and binder system.

26. The powder and binder system according to claim 24 wherein said ceramic powder is selected from the group consisting of silica, alumina, zirconia, silicon nitride, aluminum nitride and silicon carbide.

27. The powder and binder system according to claim 1 wherein said powder particles are an intermetallic powder.

28. The powder and binder system according to claim 1 wherein said elasticizing agent is selected from the group consisting of an elastomer, an acrylic polymer, and an inorganic polymer.

29. The powder and binder system according to claim 1 wherein said additive coating is coherent about said particles.

30. The powder and binder system according to claim 1 wherein said respective particle surface is coated with a plurality of additives.

31. The powder and binder system according to claim 1 wherein said powder particles are coated by spray drying.

32. The powder and binder system according to claim 1 wherein said powder particles are coated by fluidized bed approaches.

33. The powder and binder system according to claim 1 wherein said powder particles are coated by emulsion techniques.

34. The powder and binder system according to claim 1 wherein said powder particles are coated by solvent slurry techniques.

35. An injection moldable powder and binder system comprising:
   (a) a powder for injection molding;
   (b) a binder system comprising
      an extractable polar component and a plasticizer/compatibilizer; wherein said plasticizer/compatibilizer compatibilizes said polar component.

36. The powder and binder system according to claim 35 wherein said powder and binder system are mixed.

37. The powder and binder system according to claim 35 wherein said powder and binder system are compounded.

38. The powder and binder system according to claim 35 wherein said plasticizer/compatibilizer is monoglycerol monostearate.

39. The powder and binder system according to claim 3 wherein said plasticizer/compatibilizer is a glycerol ester.

40. The powder and binder system according to claim 1 or claim 14 wherein said powder is sinterable.

41. The powder and binder system according to claim 1 or claim 35 further comprising a powder system comprising a prealloyed powder and an elemental/semi-elemental powder.

42. The powder and binder system according to claim 41 wherein said powder system is comprised of 30 to 75 percent by weight prealloyed metallic powder.

43. The powder and binder system according to claim 41 wherein said powder system is comprised of 30 to 90 percent by weight elemental/semi-elemental metallic powder.

44. The powder and binder system according to claim 1 or claim 35 further comprising a powder system comprising a prealloyed powder and an elemental/master-alloy powder.

45. The powder and binder system according to claim 1 or claim 35 further comprising a powder system comprising a prealloyed powder, an elemental/semi-elemental powder and an elemental/master-alloy powder.

46. The powder and binder system according to claim 1 or claim 35 wherein said powder and said binder are combined in a substantially inert atmosphere.

47. A process for powder injection molding components from the powder and binder system according to claim 1 or claim 35, comprising the steps of:

(a) molding said powder and binder system to form a component;

(b) debinding said component by at least partially removing said binder; and (c) sintering said powder.

* * * * *

UNITED STATES PATENT AND TRADEMARK OFFICE
CERTIFICATE OF CORRECTION

PATENT NO. : 5,641,920              Page 1 of 4
DATED     : June 24, 1997
INVENTOR(S) : Karl Frank Hens and Joseph A. Grohowski, Jr.

It is certified that error appears in the above-identified patent and that said Letters Patent is hereby corrected as shown below:

Title Page, in the ABSTRACT, line 15, after "system" delete comma --,--.

Title Page, in the ABSTRACT, line 16, after "sintering" insert --of--.

Column 1 Line 14 "Hens et at." should read --Hens et al.--.

Column 1 Line 15 "Kihara et at." should read --Kihara et al.--.

Column 1 Line 18 "Adee et at." should read --Adee et al.--.

Column 1 Line 26 after "impossible" insert comma --,--.

Column 2 Line 12 "paxtides" should read --particles--.

Column 2 Lines 24-25 "a injection" should read --an injection--.

Column 3 Line 19 after "system" delete comma --,--.

Column 3 Line 53 "a iron" should read --an iron--.

Column 4 Line 63 "assuming" should read --assume--.

Column 5 Line 22 "is superior" should read --are superior--.

Column 5 Line 33 "exhibit" should read --exhibits--.

Column 5 Line 39 "has shown" should read --has been shown--.

Column 5 Line 46 "certaining" should read --containing--.

Column 5 Line 56 "appropriate additives" should read --appropriate additive--.

UNITED STATES PATENT AND TRADEMARK OFFICE
CERTIFICATE OF CORRECTION

PATENT NO. : 5,641,920                          Page 2 of 4
DATED : June 24, 1997
INVENTOR(S) : Karl Frank Hens and Joseph A. Grohowski, Jr.

It is certified that error appears in the above-identified patent and that said Letters Patent is hereby corrected as shown below:

Column 5 Line 66 "dependant" should read --dependent--.

Column 6 Line 5 after "binder" delete comma --,--.

Column 6 Lines 17-18 after "deactivators" insert comma --,--.

Column 6 Line 24 "Tetrakis" should read --tetrakis--.

Column 6 Line 45 "(bis 2-propenolatomethyl)" should read --(bis-2-propanolatomethyl)--.

Column 6 Line 47 "Other timnates" should read --Other titanates--.

Column 6 Line 67 through Column 7 Line 1 "N-(-aminoethyl)-aminopropyltrimethoxysilane" should read --N-($\beta$-aminoethyl)-$\gamma$-aminopropyl trimethoxy silane--.

Column 7 Line 8 "(bis 2-propenolatomethyl)" should read --(bis-2-propanolatomethyl)--.

Column 7 Line 10 after "titanates such" insert --as--.

Column 7 Line 57 between "molding" and "residual stresses" insert comma --,--.

Column 8 Line 38 after "iron" delete comma --,--.

Column 8 Lines 64-65 after "component" delete --serves--.

Column 9 Line 13 "a polymers" should read --a polymer--.

Column 9 Line 26 after "components" delete comma --,--.

UNITED STATES PATENT AND TRADEMARK OFFICE
CERTIFICATE OF CORRECTION

PATENT NO. : 5,641,920                              Page 3 of 4
DATED      : June 24, 1997
INVENTOR(S): Karl Frank Hens and Joseph A. Grohowski, Jr.

It is certified that error appears in the above-identified patent and that said Letters Patent is hereby corrected as shown below:

Column 9 Line 36 after "collection unit" insert comma --,--.

Column 9 Line 39 after "systems" delete comma --,--.

Column 9 Line 55 under EXAMPLE ONE, first compound, "N-(-aminoethyl)- -aminopropyltrimethoxysilane" should read --N-($\beta$-aminoethyl)-$\gamma$-aminopropyl trimethoxy silane--.

Column 9 Line 62 "Poly oxymethylene" should read --Polyoxymethylene--.

Column 10 Line 1 "(bis 2-propenolatomethyl)" should read --(bis-2-propanolatomethyl)--.

Column 10 Line 8 "Poly oxymethylene" should read --Polyoxymethylene--.

Column 10 Line 21 "Peiris et at." should read --Peiris et al.--.

Column 10 Line 21 "Hens et at." should read --Hens et al.--.

Column 10 Line 22 "Kim et at." should read --Kim et al.--.

Column 10 Line 25 "Adee et at." should read --Adee et al.--.

Column 10 Line 53 "depend" should read --depends--.

Column 10 Line 65 "rebound" should read --debound--.

Column 11 Line 10 "I claim:" should read --We claim:--.

Claim 8 Column 11 Line 41 "poly(2-ethyl 2-oxazoline)" should read --poly(2-ethyl-2-oxazoline)--.

UNITED STATES PATENT AND TRADEMARK OFFICE
CERTIFICATE OF CORRECTION

PATENT NO. : 5,641,920
DATED : June 24, 1997
INVENTOR(S) : Karl Frank Hens and Joseph A. Grohowski, Jr.

It is certified that error appears in the above-identified patent and that said Letters Patent is hereby corrected as shown below:

Claim 12 Column 11 Line 52 "according to claim 11" should read --according to claim 1--.

Claim 39 Column 12 Line 64 "according to claim 3" should read --according to claim 35--.

Signed and Sealed this

Eleventh Day of August 1998

Attest:

BRUCE LEHMAN

Attesting Officer

Commissioner of Patents and Trademarks